(12) United States Patent
Bevington

(10) Patent No.: US 6,509,871 B2
(45) Date of Patent: Jan. 21, 2003

(54) PARTIALLY COHERENT BEAMFORMER FOR SPARSE, IRREGULAR ARRAYS

(75) Inventor: James E. Bevington, Plymouth, MN (US)

(73) Assignee: General Dynamics Information Systems, Inc., Bloomington, MN (US)

( * ) Notice: Subject to any disclaimer, the term of this patent is extended or adjusted under 35 U.S.C. 154(b) by 0 days.

(21) Appl. No.: 09/776,282

(22) Filed: Feb. 2, 2001

(65) Prior Publication Data

US 2002/0105464 A1 Aug. 8, 2002

Related U.S. Application Data

(60) Provisional application No. 60/180,457, filed on Feb. 4, 2000.

(51) Int. Cl.[7] .............................. H01Q 3/22; H01Q 3/24; H01Q 3/26
(52) U.S. Cl. ..................................... 342/373; 342/357.1
(58) Field of Search ......................... 342/357.09, 357.1, 342/373, 375; 367/20, 62

(56) References Cited

U.S. PATENT DOCUMENTS

| | | | | |
|---|---|---|---|---|
| 3,774,146 A | * | 11/1973 | Goupillaud | |
| 4,152,691 A | * | 5/1979 | Ward | |
| 4,559,605 A | | 12/1985 | Norsworthy | ................. 364/726 |
| 5,099,456 A | * | 3/1992 | Wells | .......................... 367/127 |
| 5,838,816 A | * | 11/1998 | Holmberg | ................... 382/157 |
| 5,930,202 A | | 7/1999 | Duckworth et al. | ......... 367/127 |
| 6,208,189 B1 | * | 3/2001 | Freeman et al. | ............ 327/277 |

* cited by examiner

*Primary Examiner*—Theodore M. Blum
(74) *Attorney, Agent, or Firm*—Jenner & Block, LLC

(57) ABSTRACT

A system and method for beamforming signals received in sparse, irregular sensor arrays has a network of sensors organized into sensor clusters, a signal processing node for each sensor cluster for beamforming the signals received by the sensors in each sensor cluster and an aggregation node for combining the beamformed responses from each sensor cluster to form a composite response characterized by minimized side lobes and grating lobes.

43 Claims, 2 Drawing Sheets

PARTIALLY COHERENT BEAMFORMER FOR SPARSE, IRREGULAR ARRAYS

CROSS-REFERENCES TO RELATED APPLICATIONS

This application claims priority from U.S. Provisional Patent Application Ser. No. 60/180,457 filed on Feb. 4, 2000.

BACKGROUND OF THE INVENTION

1. Field of the Invention

The present invention relates to a method and system for beamforming signals. More specifically, the present invention beamforms signals received in sparse, irregular sensor arrays by grouping sensors into clusters, beamforming the signals at each cluster independently of other clusters, and creating a composite response representative of the magnitude and heading of the signals by combining the beamformed responses from each cluster.

2. Description of the Related Art

Beamforming is a method used to process waveform signals such as acoustic, radar or sonar signals detected by an array of sensors. When a source generates a signal that is detected by an array of sensors, beamforming provides a way to determine the magnitude and angle-of-arrival, or azimuth, of the detected signal relative to the array of sensors. For example, the bearing of a ship relative to an array of sensors deployed near the ship may be determined by beamforming the acoustic or sonar signals detected by the array of sensors.

Systems using beamform processing typically include an array of sensors that are linked to signal processing equipment. When an object emits a signal within the detecting range of the beamforming system, the sensors in the array collect and transmit the signal to the processing equipment where the beamforming process is performed. The signals are converted from analog to digital signals by an analog to digital converter either at the sensors or at the processing equipment. During beamforming, the signals detected by each of the sensors are compared to determine the magnitude or power of the detected signal at various azimuths relative to the sensor array. In this manner, the bearing or azimuth of the signal is determined.

There are several beamforming algorithms known to those skilled in the art that may be implemented by beamform systems. Two widely accepted beamforming algorithms are delay and sum beamforming and Fast Fourier Transform ("FFT") beamforming. It is not critical to the present invention what type of beamforming algorithm is implemented.

One limitation of existing beamforming systems is that sparse sensor arrays can lead to inaccurate beamforming results. Logistically, it is desirable to use few sensors and distribute them over a great area because sensors can be expensive and difficult to deploy in remote areas. It is also advantageous, logistically, to spread the sensor elements over a great distance to provide the greatest range of detection. The desire to use fewer sensors over a broader area results in thinly populated, or sparse, sensor arrays.

While there are logistical reasons for using sparse sensor arrays, beamforming systems are usually more accurate if more sensors are used, and if they are positioned to create densely packed sensor arrays. If the sensors are positioned too far apart from one another, grating lobes begin to emerge in the beamformed response. Linear and circular acoustic arrays typically have been designed with sensor spacings on the order of one-half wavelength at the highest frequency of operation to avoid grating lobes. If the highest frequency of operation for a beamforming system is 300 Hz, for example, then the sensors must be placed within about 0.5 meters of each other to avoid grating lobes. In addition, when waveform signals such as acoustic signals carry through a propagation medium, such as air, non-uniformity in the propagation medium limits the distance over which the wavefront remains coherent. If sensors are spread too far apart, the effect of this wavefront incoherence becomes more pronounced and severe de-focusing can occur when traditional coherent processing techniques are applied. Finally, if sensors are positioned too far apart, it becomes more difficult for the system to differentiate between signals radiating simultaneously from two different sources.

Another limitation of existing beamforming systems is that they require powerful central processing nodes capable of receiving and beamforming signals detected by all of the sensors. The processing power necessary to receive and beamform all of the signals increases proportionally with the number of sensors in the sensor array. Processing power constraints, therefore, impose a practical limit on the number of sensors connected to the central processing node, and consequently limit the accuracy of the system.

Yet another limitation of existing beamforming systems is that they require broad communications bandwidth to jointly process the signals detected at the different sensors in the sensor array. At some point during the beamforming process, signals or measurements from each of the different sensors must be transmitted to a central processing node for phase or time-of-arrival comparison, depending on the beamforming method used. Typically this transmission between the sensors and the central processing node is accomplished by radio transmitters. The total radio frequency bandwidth required for this aggregation process increases proportionally with the number of sensors in the system. While bandwidth demands may be reduced through pruning in either time or frequency and through the use of data compression, the total bandwidth required will still increase, at least linearly, with the number of sensors in the sensor array. Bandwidth limitations impose a practical limit on the number of sensors connected to the central processing node, and thus limit the accuracy of the system.

Yet another limitation to existing beamforming systems is the power requirements of operating a dense sensor array. Sensors and processing nodes are often battery powered. Sensors on the perimeter of the array draw a relatively high amount of power from their batteries to transmit their signals to the central processing node, whether by wire or radio transmission. The power requirements of the system place design limitations on the size and density of the sensor array. In addition, the central processing node draws a high amount of power to support the beamform processing of all of the sensors in the array.

Therefore, it would be desirable to provide a beamforming system and method that permits sparse, irregular placement of sensors without sacrificing accuracy or performance. It would also be desirable to provide a system and method for detecting and processing signals in which processing and data aggregation in the beamforming process is organized hierarchically in a spatial sense such that processing demands are distributed and available communications bandwidth is increased. Finally, it would be desirable to provide a system and method for beamforming signals that operates more efficiently to consume less power.

SUMMARY OF THE INVENTION

The present invention is a system and method for beamforming signals that overcomes the aforementioned problems in existing systems. The system of the present invention can include a plurality of sensors for receiving signals. The sensors can be organized into at least one sensor cluster, each sensor cluster including at least one sensor. The sensors can be acoustic, sonar, radar or multi-signal sensors capable of detecting a variety of signal types. The system can include a signal processing node for each sensor cluster that beamforms signals received by sensors in the sensor clusters, and at least one aggregation node for determining a composite response of the beamformed signals. Sensor links transmit signals received by the sensors from the sensors to the signal processing nodes, and signal processing links transmit beamformed signals from the sensor processing nodes to the aggregation node.

According to one embodiment of the invention, sensors links can be wire connectors. In another embodiment of the invention, each sensor can include radio transceivers, and the signal processing nodes can include multi-channel radio transceivers. Sensor links can use radio frequency transmissions between the sensor radio transceivers and the multi-channel radio transceivers.

According to one embodiment of the invention, signal processing node links are wire connectors. In another embodiment of the invention, each aggregation node can include an aggregation node radio transceiver, and each signal processing node can include a multi-channel radio transceiver. Signal processing node links can use radio frequency transmissions between the multi-channel radio transceiver and the aggregation node radio transceiver.

In yet another embodiment of the invention each sensor includes a global positioning system receiver for determining the positions of the sensors.

The method of the present invention can include the steps of deploying an array of sensors in an area, determining the relative positions of the sensors, organizing the array of sensors into sensor clusters wherein each sensor cluster includes at least one sensor, detecting signals in the in the sensors, creating beamformed responses by beamforming the signals detected by the sensors in each sensor cluster such that the signals detected by the sensors in each sensor cluster are beamformed independently of the signals detected by other sensor clusters, and creating a composite response of all the beamformed responses by combining the beamformed responses together.

In one embodiment of the invention, the step of creating a composite response includes the step of multiplying the beamformed responses together such that the composite response, X(k), is:

$$X(k)=X_1(k)*X_2(k)* \ldots *X_n(k) * \ldots *X_N(k),$$

where $X_n(k)$ is the beamformed response for the nth sensor cluster, and N is the total number of sensor clusters. The beamformed responses can be pre-edited prior to multiplying them together by, for example, removing those beamformed responses that have the highest and lowest magnitudes.

In another embodiment of the invention, the step of creating a composite response includes the steps of performing a low order statistic on each of the beamformed responses, and using the results obtained from the low order statistic to form the composite response.

The present invention overcomes the limitations of existing beamformer systems and methods. The present invention provides a beamforming system and method for processing signals received by sparse, irregular sensor arrays. By organizing sensors into sensor clusters, and beamforming at each individual sensor cluster, the relative distance between any two sensors that are beamformed together is limited by the size of the sensor clusters. The grating lobe effect that is characteristic of arrays with sensors spaced too far apart is minimized by combining individual beamformed responses from each signal processing node to form a composite response.

The present invention also provides a beamforming system and method in which processing and data aggregation in the beamforming process is organized hierarchically in a spatial sense such that processing demands are distributed and available communications bandwith is increased. Because beamforming is performed at each signal processing node, processing demands are distributed across the entire system. Available communications bandwidth is increased because radio frequencies used by the sensors in one cluster to transmit signals to the signal processing node can be reused in other sensor clusters. Sensors are located relatively close to the signal processing nodes, therefore radio links can be accomplished using relatively low transmission power. Low transmission power allows sensor clusters that are distant from one another to reuse the same frequencies without radio interference.

The present invention also provides a beamforming system and method that operates more efficiently to consume less power. Because the sensors are organized into clusters, they transmit to the signal processing nodes across shorter distances, using less power. In addition, because processing is distributed across all signal processing nodes, it is performed more efficiently and with less power.

DETAILED DESCRIPTION OF THE PREFERRED EMBODIMENT

Figure 1:
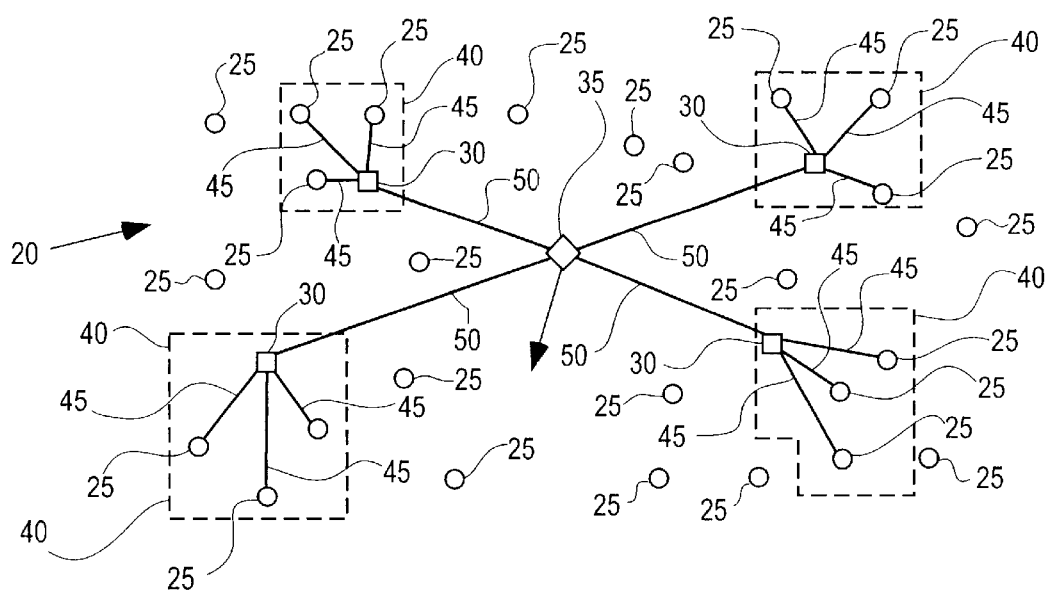
FIG. 1 is a schematic of a sensor network according to the present invention.

Referring to FIG. 1, a beamformer according to the present invention preferably comprises a sensor network 20 including a plurality of sensors 25, at least one signal processing node 30 and at least one aggregation node 35.

In a preferred embodiment of the present invention, sensors 25 are omni-directional acoustic sensors. Sensors 25 can also be sonar or radar sensors, or multi-signal sensors capable of detecting signal types including, but not limited to, acoustic, sonar and radar. In a preferred embodiment of the invention, sensors 25 include a sensor radio transceiver for transmitting data to a signal processing node 30. Each sensor 25 is preferably equipped with a carrier phase based global positioning system ("GPS") receiver for determining the relative position of each sensor 25 with respect to other sensors 25 in the same sensor cluster 40. The relative positions of each sensor 25 can be transmitted via the sensor radio transceiver to a signal processing node 30. If sensors 25 are not equipped with GPS receivers, then their relative positions may be measured. In another preferred embodiment of the invention, sensors 25 transmit data to a signal processing node 30 over a wire connection.

Sensors 25 are preferably deployed over an area in an array that forms sensor network 20. Sensors 25 may be positioned in a random array, such that the spacing between each sensor 25 in sensor network 20 need not be uniform.

Figure 2:
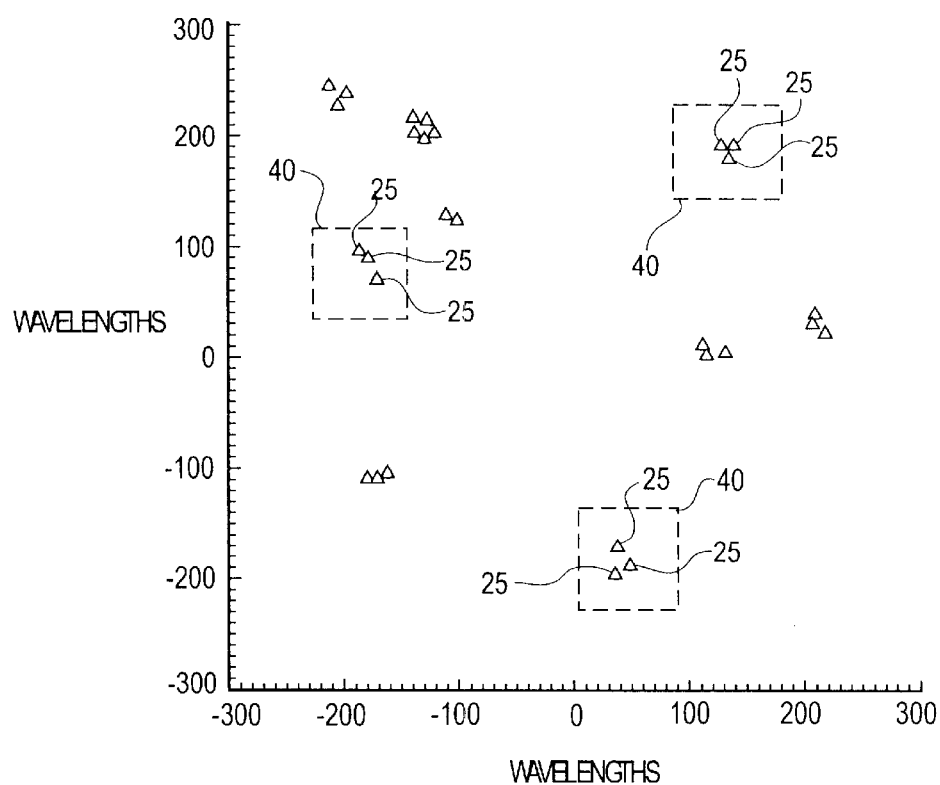
FIG. 2 is a diagram of the relative positions of the sensors used in a simulation of the present invention.

In a preferred embodiment of the invention, sensors 25 are randomly deployed to form sensor network 20, then organized into sensor clusters 40 based on their proximity to other sensors in sensor network 20. As shown in FIG. 1, sensors 25 that are positioned near each other are grouped within the same sensor cluster 40. As shown in FIGS. 1 and 2, the spacing of sensors 25 is random, and sensors 25 within each cluster may be spaced several wavelengths apart. In the preferred embodiment of the invention, each cluster includes from one to five individual sensors 25, although any number of sensors in close proximity to one another may be included in each sensor cluster 40.

As shown in FIG. 1, each sensor 20 within a sensor cluster 40 is connected by a sensor link 45 to a common signal processing node 30 assigned to that sensor cluster 40. According to a preferred embodiment of the invention, sensor link 45 is made by radio transmission between the sensor radio transceiver in each sensor 25 and a multi-channel radio transceiver in the processing node 30 assigned to that sensor cluster 40. The sensor radio transceiver in each sensor 25 preferably transmits over a unique frequency so that signal processing node 30 can differentiate between signals from each sensor 25 in that particular sensor cluster 40. According to a preferred embodiment of the invention, the frequencies used in one sensor cluster 40 may be reused in another sensor cluster 40 provided the sensor radio transceiver transmits a low power signal and the distance between sensor clusters 40 is sufficient to prevent inter-cluster radio interference.

In another preferred embodiment of the invention, sensors 25 are deployed in pre-assigned clusters and sensor links 45 are made by wire connection prior to deployment. According to this embodiment, it is not necessary to assign sensors 25 to sensor clusters 40 after deployment because sensors 25 are connected by wire to a signal processing node 30 which predetermines the sensor cluster 40 to which they are assigned.

Signal processing nodes 30 beamform those signals from the sensor clusters 40 they are assigned, such that each sensor cluster 40 of sensors 25 is treated as an independent beamformer sensor array. The beamforming processing in each signal processing node 30 occurs independently of the processing performed by other signal processing nodes 30 on signals from sensors 25 in other sensor clusters 40. Any type of beamforming processing may be used at each signal processing node 30, including, but not limited to, delay and sum beamforming and Fast Fourier Transform ("FFT") beamforming.

Beamformed responses from each of the signal processing nodes 30 are transmitted over aggregation node link 50 to aggregation node 35. Although only one aggregation node 35 is depicted in FIG. 1, in another preferred embodiment of the invention signal processing nodes 30 may be organized into clusters and assigned to one of several aggregation nodes 35, which are then linked to a central processing node. Aggregation node links 50 are preferably made by radio transmission between a processing node radio transceiver in each signal processing node 30 and an aggregation node radio transceiver in aggregation node 35. In another preferred embodiment of the invention, node link 50 is made by wire. A unique frequency is preferably used for each link 50 so that aggregation node 35 can differentiate between signals arriving from the different signal processing nodes 30.

In a system according to the present invention in which there are N total number of signal processing nodes 30, the beamformed responses transmitted by any one signal processing node 30, or the nth signal processing node, to aggregation nodes 35 may be represented by the array: $X_n(k)$, where X represents the response magnitude values determined by the nth signal processing node 30 for each azimuth bin, k. For example, if the full 360-degree azimuth range were divided into five-degree increments, 72 azimuth bins, k, would exist, one for each 5-degree increment. The array, $X_n(k)$, determined by the nth signal processing node would therefore contain a response magnitude value, X, for each of the 72 azimuth bins, k.

Aggregation node 35 creates a composite response, X(k), by combining the responses, $X_n(k)$, from each of the N total signal processing nodes 30. In a preferred embodiment of the invention, the composite response is created by multiplying together the responses from each signal processing node 35: $X_1(k), X_2(k) \ldots X_n(k) \ldots$ and $X_N(k)$.

Therefore, the composite response, X(k), is:

$$X(k)=X_1(k)*X_2(k)*\ldots *X_n(k) * \ldots *X_N(k).$$

If the system contains more than one aggregation node 35, then the composite responses, X(k), from each aggregation node 35 can be combined to determine an overall composite response using a similar multiplication operation.

Simulation configuration and results for a single-frequency simulation of the present invention are shown in FIGS. 2 and 3a–3d. FIG. 2 depicts a simulated random array of sensors 25. The relative positions of sensors 25 are shown in terms of the wavelength of the simulated input signal. Sensors 25 are grouped into sensor clusters 40 of three to five sensors 25. Due to the random placement of sensors 25, the distance between sensors 25 within sensor clusters 40 exceeds twenty wavelengths in some instances. Signal processing nodes 30, sensor links 45, aggregation nodes 35 and aggregation node links 50 are not shown in FIG. 2.

Figure 3A:
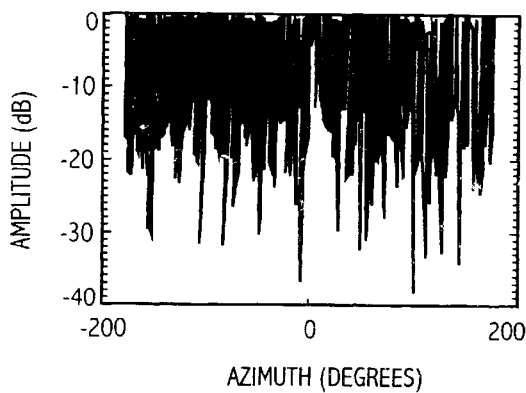
FIG. 3a is graph plotting the overlaid simulated beamformed responses of all of the signal processing nodes for a single frequency signal input across a 360 degree azimuth range according to the present invention.
Figure 3B:
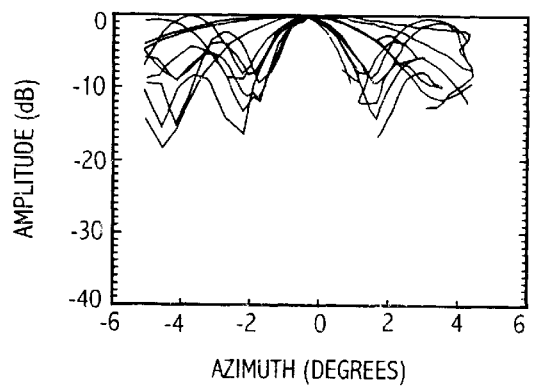
FIG. 3b is graph plotting the overlaid simulated beamformed responses of all of the signal processing nodes for a single frequency signal input across a ten degree azimuth range according to the present invention.
Figure 3C:
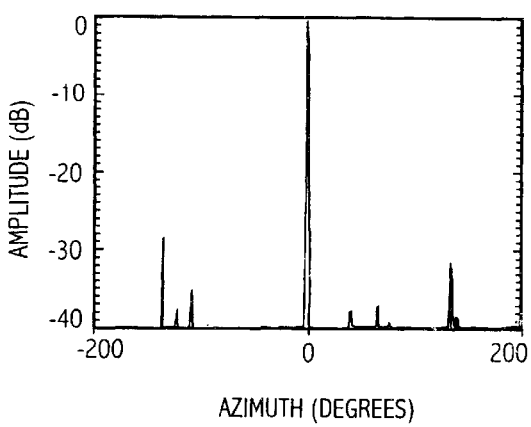
FIG. 3c is a plot of a simulated composite beamformed response determined in the aggregation node for a single frequency input across a 360 degree azimuth range according to the present invention.
Figure 3D:
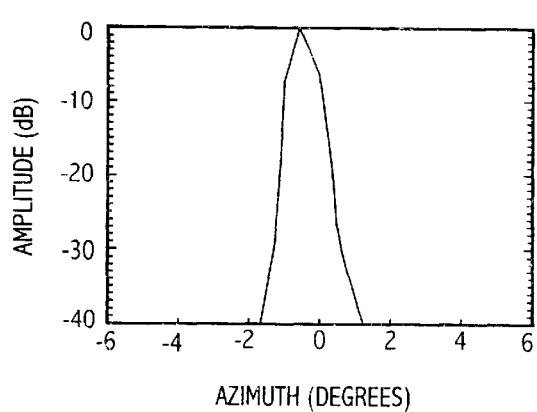
FIG. 3d is a plot of a simulated composite beamformed response determined in the aggregation node for a single frequency input across a ten degree azimuth range according to the present invention.

In FIG. 3a, the simulated beamformed responses, $X_n(k)$, for each of the signal processing nodes 30 as configured in FIG. 2 are plotted and overlaid onto a single graph. The simulated signal source is located at the zero degree azimuth. The magnitude or amplitude, in decibels, of the responses are shown as a function of azimuth, in degrees, across the entire 360 degree azimuth range. As shown, significant side lobes and grating lobes appear in the responses from signal processing nodes 35. FIG. 3b shows the same information as FIG. 3a, except across a narrower azimuth range. Significant side lobes and grating lobes appear for each of the individual beamformer responses at azimuths to either side of the zero azimuth. Grating lobes are expected in the individual beamformer responses because the spacing between sensors 25 used in the simulation is often greater than one-half the wavelength of the simulated input signal. FIGS. 3c and 3d show the composite response, X(k), that was calculated in aggregation node 35 by multiplying together the individual beamformer responses, $X_n(k)$. Because the side lobes and grating lobes for each individual beamformer occur at different azimuths, as shown in FIG. 3b, they tend to cancel one another out when multiplied together. As shown in FIGS. 3c and 3d, the side lobes and grating lobes are reduced and a single response at zero azimuth remains.

Because the beamforming system of the present invention organizes randomly spaced sensors 25 into sensor clusters 40 and beamforms each sensor cluster 40 independently, a composite beamformed response can be formed in which the side lobes and grating lobes are minimized. In another embodiment of the present invention, the beamformed responses, $X_n(k)$, from each of the signal processing nodes 30 can be pre-edited prior to forming the composite response by filtering, for example, the highest and lowest magnitude at each azimuth bin.

In yet another embodiment of the present invention, the multiplication operation performed at aggregation node 35 to form composite response, X(k), can be replaced by a low order statistic of each azimuth bin across sensor clusters 40. For example, the magnitude response values for every sensor cluster 40 at a particular azimuth could be compared and only the second or third smallest response magnitude values could be retained. This process could be repeated for each azimuth bin to form a composite response consisting of only the second or third smallest response magnitude values of all sensor clusters 40 for each azimuth. In this manner, high magnitude response peaks occurring as a result of side lobes would be filtered out of the composite response.

A method and system for beamforming according to the present invention overcomes the limitations of methods and systems known in the art. The present invention provides a beamforming method and system for processing signals detected by sparse, irregular arrays. By organizing sensors 25 into sensor clusters 40, and beamforming at each individual sensor cluster 40, the relative distance between any two sensors 25 that are beamformed together is limited by the size of sensor clusters 40. Rather than beamforming together sensors 25 that could be very distant from one another in sensor network 20, only those sensors 25 in the same cluster are beamformed together. In addition, the grating lobe effect that results from spacing sensors 25 too far apart is minimized by combining individual beamformed responses calculated at each signal processing node 30 to form a composite response.

The present invention also provides a beamforming method and system in which processing and data aggregation in the beamforming process is organized hierarchically in a spatial sense to distribute processing demands and increase available communications bandwith. Because beamforming is performed at each signal processing node 30, processing demands are distributed across the entire system, rather than being concentrated in one central processing node. In addition, available communications bandwidth is increased because radio frequencies used by sensors 25 to transmit to aggregation nodes 30 can be reused in other sensor clusters 40. Because sensors 25 are arranged into sensor clusters 40, they are located relatively close to signal processing nodes 30. Communication between sensors 25 and signal processing nodes 30 can be accomplished using relatively low transmission power. Low transmission power allows sensor clusters 40 that are distant from one another in sensor network 20 to reuse the same transmission frequencies without radio interference. In this manner, available bandwidth is increased.

The present invention also provides a beamforming method and system that operates more efficiently to consume less power. Because sensors 25 are organized into sensor clusters 40, they transmit to signal processing nodes 30 across shorter distances and therefore use less power. This power savings results in improved battery life of sensors 25. In addition, because signal processing is distributed across all signal processing nodes 30, it is performed more efficiently and with less power.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A beamforming system, comprising:
a plurality of sensors for receiving signals, said sensors organized into at least one sensor cluster, wherein each said sensor cluster includes at least one of said sensors;
at least one signal processing node for each said sensor cluster for beamforming signals received by said at least one sensor in said at least one sensor cluster;
at least one aggregation node for determining a composite response of said beamformed signals;
a plurality of sensor links for transmitting signals received by said plurality of sensors from said plurality of sensors to said at least one signal processing node; and
at least one signal processing node link for transmitting from said at least one signal processing node said beamformed signals to said at least one aggregation node.

2. The beamforming system of claim 1 wherein said plurality of sensors are multi-signal sensors.

3. The beamforming system of claim 1 wherein said plurality of sensors are acoustic sensors.

4. The beamforming system of claim 1 wherein said plurality of sensors are sonar sensors.

5. The beamforming system of claim 1 wherein said plurality of sensors are radar sensors.

6. The beamforming system of claim 1 wherein said plurality of sensors each include a global positioning system receiver.

7. The beamforming system of claim 1 wherein said plurality of sensor links are wire connectors.

8. The beamforming system of claim 7 wherein said plurality of sensors each include a global positioning system receiver.

9. The beamforming system of claim 8 wherein said aggregation node includes an aggregation node radio transceiver, wherein said at least one signal processing node includes a multi-channel radio transceiver, and wherein said at least one signal processing node link uses radio frequency transmission between said multi-channel radio transceiver and said aggregation node radio transceiver.

10. The beamforming system of claim 1 wherein said plurality of sensors each include sensor radio transceivers, wherein said at least one signal processing node includes a multi-channel radio transceiver, and wherein said plurality of sensor links use radio frequency transmissions between said sensor radio transceivers and said multi-channel radio transceiver.

11. The beamforming system of claim 10 wherein said at least one signal processing node link is a wire connection.

12. The beamforming system of claim 10 wherein said plurality of sensors each include a global positioning system receiver.

13. The beamforming system of claim 12 wherein said at least one signal processing node link is a wire connection.

14. The beamforming system of claim 10 wherein said aggregation node includes an aggregation node radio transceiver, wherein said at least one signal processing node includes a multi-channel radio transceiver, and wherein said at least one signal processing node link uses radio frequency transmission between said multi-channel radio transceiver and said aggregation node radio transceiver.

15. The beamforming system of claim 1 wherein said at least one signal processing node link is a wire connection.

16. The beamforming system of claim 15 wherein said plurality of sensors each include a global positioning system receiver.

17. The beamforming system of claim 1 wherein said aggregation node includes an aggregation node radio transceiver, wherein said at least one signal processing node includes a multi-channel radio transceiver, and wherein said at least one signal processing node link uses radio frequency transmission between said multi-channel radio transceiver and said aggregation node radio transceiver.

18. The beamforming system of claim 17 wherein said plurality of sensors each include a global positioning system receiver.

19. A beamforming system, comprising:
a plurality of sensors for receiving signals, said sensors organized into at least one sensor cluster, wherein each said sensor cluster includes at least one of said sensors, each said sensor including:
(a) a global positioning system receiver for determining the positions of said sensor, and
(b) a sensor radio transceiver;
at least one signal processing node for beamforming signals received by said plurality of sensors, said signal processing node including a multi-channel radio transceiver;
at least one aggregation node for determining a composite response of said beamformed signals, said at least one aggregation node including an aggregation node radio transceiver;
a plurality of sensor links for transmitting signals received by said plurality of sensors by radio frequency transmission between said sensor radio transceivers and said multi-channel radio transceiver; and
at least one signal processing node link for transmitting said beamformed signals by radio frequency transmission between said multi-channel radio transceiver and said aggregation node radio transceiver.

20. A method for beamforming, comprising the steps of:
deploying a plurality of sensors in an area;
determining the relative positions of the sensors;
organizing the plurality of sensors into at least one sensor cluster wherein each sensor cluster includes at least one sensor;
detecting signals in the sensors;
creating beamformed responses by beamforming the signals detected by the sensors in each sensor cluster, wherein the signals detected by the sensors in each sensor cluster are beamformed independently of the signals detected in other sensor clusters;
creating a composite response of all the beamformed responses by combining the beamformed responses together.

21. The method for beamforming of claim 20 wherein said creating beamformed responses is by delay and sum beamforming.

22. The method of beamforming of claim 20 wherein said creating beamformed responses is by Fast Fourier Transform beamforming.

23. The method for beamforming of claim 20 wherein said determining the relative positions of the sensors step is accomplished by carrier phased based global positioning.

24. The method of beamforming of claim 23 wherein said creating beamformed responses is by delay and sum beamforming.

25. The method of beamforming of claim 23 wherein said creating beamformed responses is by Fast Fourier Transform beamforming.

26. The method for beamforming of claim 20 wherein said creating a composite response step includes the step of multiplying the beamformed responses together such that the composite response, X(k), is:

$$X(k)=X_1(k)*X_2(k)* \ldots *X_n(k)* \ldots *X_N(k),$$

where
$X_n(k)$ is the beamformed response for the nth sensor cluster, and
N is the total number of sensor clusters.

27. The method for beamforming of claim 26 wherein said determining the relative positions of the sensors step is accomplished by carrier phased based global positioning.

28. The method for beamforming of claim 27 wherein said creating beamformed responses is by delay and sum beamforming.

29. The method for beamforming of claim 27 wherein said creating beamformed responses is by Fast Fourier Transform beamforming.

30. The method for beamforming of claim 26 wherein said creating beamformed responses is by delay and sum beamforming.

31. The method for beamforming of claim 26 wherein said creating beamformed responses is by Fast Fourier Transform beamforming.

32. The method for beamforming of claim 26 wherein said creating a composite response step further includes the step of pre-editing the beamformed responses prior to said multiplying step by removing those beamformed responses that have the highest and lowest magnitudes.

33. The method for beamforming of claim 32 wherein said determining the relative positions of the sensors step is accomplished by carrier phased based global positioning.

34. The method for beamforming of claim 33 wherein said creating beamformed responses is by delay and sum beamforming.

35. The method for beamforming of claim 33 wherein said creating beamformed responses is by Fast Fourier Transform beamforming.

36. The method for beamforming of claim 32 wherein said creating beamformed responses is by delay and sum beamforming.

37. The method for beamforming of claim 32 wherein said creating beamformed responses is by Fast Fourier Transform beamforming.

38. The method for beamforming of claim 20 wherein said creating a composite response step includes the steps of performing a low order statistic on each of the beamformed responses, and using the results obtained from said low order statistic step to form the composite response.

39. The method for beamforming of claim 38 wherein said determining the relative positions of the sensors step is accomplished by carrier phased based global positioning.

40. The method for beamforming of claim 39 wherein said creating beamformed responses is by delay and sum beamforming.

41. The method for beamforming of claim 39 wherein said creating beamformed responses is by Fast Fourier Transform beamforming.

42. The method for beamforming of claim 38 wherein said creating beamformed responses is by delay and sum beamforming.

43. The method for beamforming of claim 38 wherein said creating beamformed responses is by Fast Fourier Transform beamforming.

* * * * *